United States Patent [19]

Holmberg

[11] Patent Number: 5,240,351
[45] Date of Patent: Aug. 31, 1993

[54] HYDRODYNAMIC CABLE DEPLOYMENT SYSTEM

[75] Inventor: Gerald E. Holmberg, Quaker Hill, Conn.

[73] Assignee: The United States of America as represented by the Secretary of the Navy, Washington, D.C.

[21] Appl. No.: 822,454

[22] Filed: Jan. 17, 1992

[51] Int. Cl.⁵ ............................................. F16L 1/12
[52] U.S. Cl. .................................... 405/166; 405/158; 405/168.3; 405/171
[58] Field of Search ................ 405/158, 166, 168.3, 405/171; 254/134.3 SC, 134.4; 226/7

[56] References Cited

U.S. PATENT DOCUMENTS

| | | | |
|---|---|---|---|
| 2,182,193 | 12/1939 | Blaschke | 226/7 X |
| 3,517,518 | 6/1970 | Horton | 405/168.3 X |
| 4,077,610 | 3/1978 | Masuda | 254/134.4 |
| 4,185,580 | 1/1980 | Pujol et al. | 405/158 X |
| 4,273,469 | 6/1981 | Lunde | 405/158 |
| 4,941,774 | 7/1990 | Harmstorf | 405/158 |

Primary Examiner—David H. Corbin
Attorney, Agent, or Firm—Michael J. McGowan; Prithvi C. Lall; Michael F. Oglo

[57] ABSTRACT

A hydrodynamic cable deployment system suitable for deploying cable from a coil on a moving underwater vessel is disclosed. The present invention provides hydrodynamic assist means for cooperation with a system for the deployment of a cable tether used for communication between a marine vessel and an expendable or non-expendable device launched therefrom by providing means for generating hydrodynamic pressure to produce a current in the direction of cable deployment, assisting in the process of stripping the cable from the coil. The means for generating hydrodynamic pressure can be implemented via a pump, or via a water intake scoop which utilizes the forward movement of the marine vessel to force water therethrough. Additional pressure can be induced and concentrated in a predetermined direction through directional nozzles. Further hydrodynamic assistance can be provided by inserting interspaced diameter constrictions within the inside diameter of a hose through which the cable is deployed, thereby providing periodic increases in the water velocity along the direction of travel of the cable.

17 Claims, 6 Drawing Sheets

HYDRODYNAMIC CABLE DEPLOYMENT SYSTEM

STATEMENT OF GOVERNMENT INTEREST

The present invention may be manufactured and used by or for the Government of the United States of America for Governmental purposes without the payment of any royalties thereon or therefor.

BACKGROUND OF THE INVENTION (1) Field of the Invention

The present invention relates to a cable deployment system and, more particularly, to a hydrodynamic cable deployment system suitable for deploying a cable tether between a sea vessel and an expendable device launched therefrom.

(2) Description of the Prior Art

Expendable devices are commonly deployed from underwater vessels wherein a wire communications link is maintained therebetween via a cable tether. When such tethered expendable devices are deployed, the communications link, as for example, a fiber optic cable, which is connected to both the launch vessel and the expendable device, is rapidly stripped away from a coil of cable stowed within the launch vessel and/or within the expendable or non-expendable device by a process called "paying out". Specific examples of applications for cable tether deployment systems which have been investigated by the U.S. Navy include fiber optic tethered torpedoes and tethered communication buoys.

In the fiber optic tethered torpedo application, the cable tether is payed out from coils of fiber optic cable housed in both a submarine and a torpedo such that the deployed portion of the cable tether is substantially stationary in the marine environment. Since launching a torpedo is an inherently high-speed operation, excessive stresses are exerted on the cable tether during the pay out process such that the fiber optic cable must be strengthened to avoid fracture or breakage of the cable. This requirement for strengthened fiber optic cable necessarily increases the cost of the torpedo deployment system.

In similar manner, the tethered communications buoy application involves the pay out of cable at both the buoy and typically a submarine. The cable is payed out at the submarine via a lifting body which houses the coil of cable and is towed above the submarine during cable deployment. In this application, the communications buoy and lifting body are launched in unison from a signal ejector tube on the submarine, the ejector tube imposing a limit on the overall size of the buoy/lifting body apparatus. Although this pay out process is not a high-speed operation and does not exert excessive stresses on the tether cable, it would be advantageous to stow the coil of cable within the larger confines of a submarine, thereby permitting the use of a greater amount of cable and enabling the communications buoy to be tethered to a greater distance. The tethered buoy presents an additional operational complication in that the lifting body becomes very unstable in the marine environment during cable pay out due to the fact that the center of mass of the lifting body varies as the cable from the spool is depleted over the pay out range. Thus, further advantages can be realized by housing the coil of cable onboard the submarine so that the lifting body will have a constant center of mass and can be made to be lighter, smaller, and simpler. These modifications reduce the cost of the lifting body and make more space available in the signal ejector tube for providing performance enhancements to the communications buoy.

SUMMARY OF THE INVENTION

The present invention discloses a hydrodynamic cable deployment system suitable for deploying, i.e., "paying out", a cable tether to provide a communications link between a sea vehicle and an expendable or non-expendable device launched therefrom. The invention is cooperative with known cable pay out systems which use coils of cable to provide a tethered communications link, and yields the capability to use less expensive unstrengthened fiber optic cable for high-speed applications and larger spools of unstrengthened fiber in pay out applications where space limitations and other constraints exist, among other benefits. In accordance with the present invention, a means for generating hydrodynamic pressure is utilized to provide a powerful current of water traveling in the direction of cable deployment to assist in stripping the cable away from the coil. Hydrodynamic pressure is generated via a pump or a water inlet valve utilizing the forward movement of the underwater vessel to force water therethrough. Additional pressure is induced and concentrated in a predetermined direction through at least one directional nozzle. Further hydrodynamic assistance can be provided by inserting a diameter restrictor within the hose through which the cable is deployed thereby periodically increasing the fluid velocity along the direction of travel of the cable.

DESCRIPTION OF THE DRAWINGS

The invention will be more fully understood from the following detailed description taken in conjunction with the accompanying drawings in which.

DETAILED DESCRIPTION OF THE INVENTION

Figure 1:
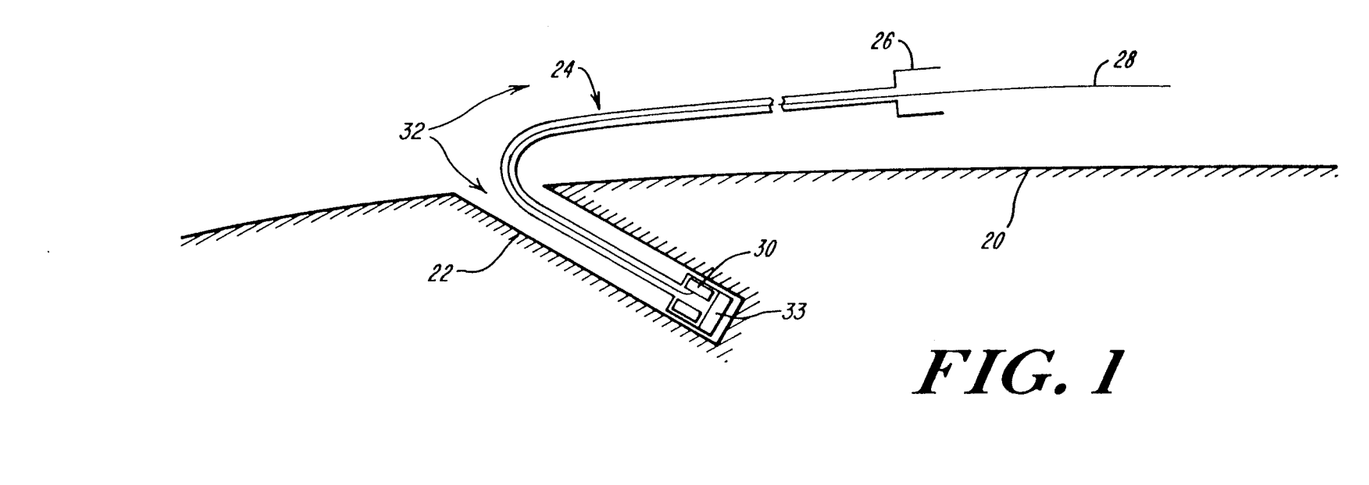
FIG. 1 is a diagrammatic view representing a cable deployment system in accordance with the present invention installed in a torpedo tube chamber formed in the pressure hull of a submarine.

The present invention is shown generally in FIG. 1 wherein the hydrodynamic cable deployment system 32 is implemented via an active system including a water pump 33 mounted adjacent to a coil of cable 30 stowed within a torpedo tube 22 in the hull of a submarine 20. When a cable guided torpedo is launched from the submarine, it pulls with it a communications tether cable 28, for example, a fiber optic cable, coupled to both the torpedo and to the submarine 20, providing a communication link therebetween. The cable is stored in a coiled configuration 30 which can be stowed on both the submarine 20 and/or the torpedo such that the cable is stripped away or "payed out" from the coil or coils as the torpedo travels through the marine environment. A flex hose generally designated 24 is also deployed from the torpedo tube 22 when the torpedo is launched, shearing off at an end 26 when pulled to its maximum length to provide a pilot chute through which the cable 28 is guided.

Figure 2A:
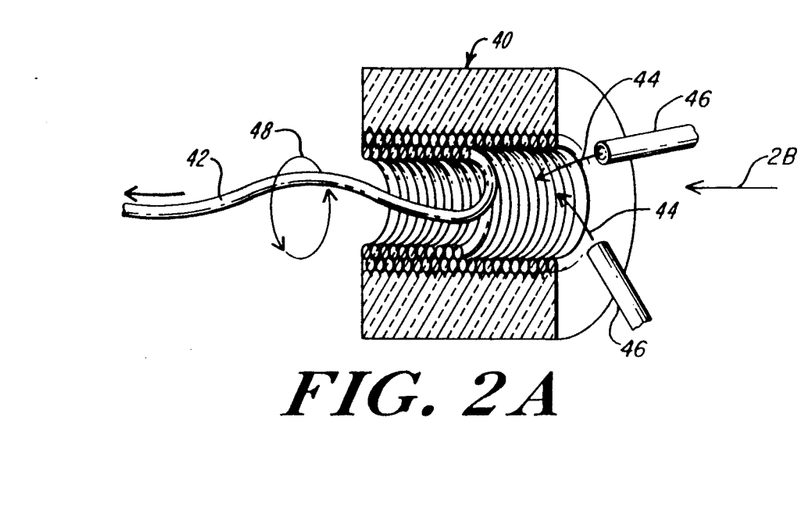
FIG. 2A is a perspective view of components of the cable deployment system of FIG. 1, namely of an annular cable dispensing coil and portions of nozzles emanating from a water pump structure.
Figure 2B:
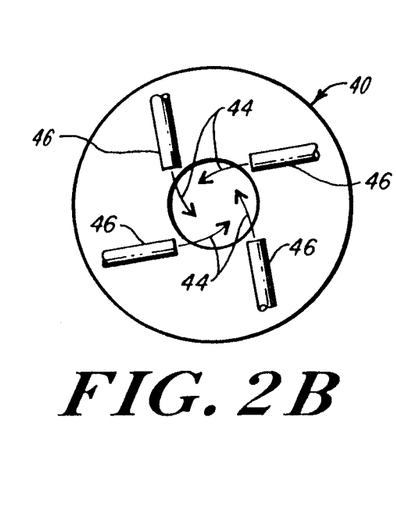
FIG. 2B is an end view taken in the direction of arrow 2B, FIG. 2A, of portions of the nozzles and one end of the annular coil shown in FIG. 2A (the view being depicted as though a view taken from transverse viewing plane cutting through the nozzles)

As shown in greater detail in FIGS. 2A and 2B, the cable tether 42 is unwound from the inside diameter of a coil generally designated 40 in a spiral direction as diagrammatically indicated. The invention provides hydrodynamic assistance to the cable deployment process by generating hydrodynamic pressure for creating high pressure water flow illustrated by arrows 44 through directional nozzles generally designated 46 that acts in directions that assist in peeling the cable off of the coil 40. The nozzles are suitably coupled with the structure of pump 33, FIG. 1. This high pressure water flow produces a vortex schematically illustrated by ring 48, inducing a powerful vortical current drawing the cable 42 away from the coil 40 in its direction of travel. Directional nozzles 46 can be aligned as appropriate so that the apparatus of the present invention can be used to assist in pay out of cable from the inner diameter, not shown, of a coil of cable or to assist in rotating a spool to unravel cable stored thereon. The hydrodynamic pressure generated by the present invention can be enhanced as shown more particularly in FIG. 3 which illustrates high pressure water represented by arrow 64, as generated by the hydrodynamic cable deployment system of the present invention, being forced in the direction of travel of cable tether 62 through a flex hose generally designated 60. Diameter restrictions generally designated 66 are interspaced within the flex hose 60, periodically reducing the inside diameter of the flex hose to provide an increase in hydrodynamic pressure along the direction of travel of the cable tether 62, wherein the rate of flow and, therefore, the force exerted on the cable tether 62, is inversely proportional to the cross sectional dimension of the flex hose. These diameter restrictions 66 also provide guide means for centering the cable 62 within the flex hose 60, resulting in smoother transitional movement therethrough.

Figures 3, 4:
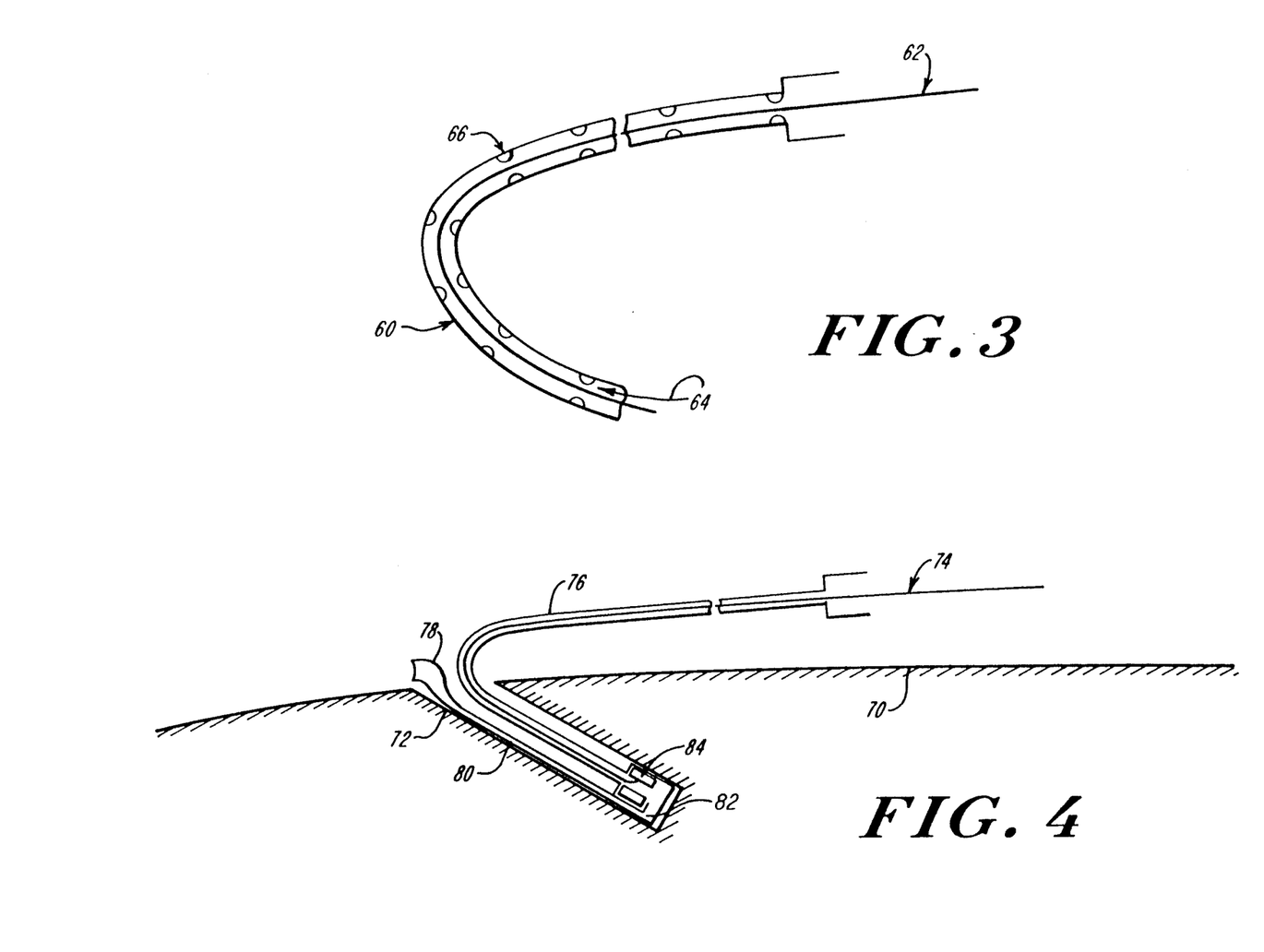
FIG. 3 is a diagrammatic view of another component of the cable dispensing system, namely of the flex hose which (after launch of the torpedo) extends from components remaining at the inner end of the torpedo tube, out through the tube, and into the stream along the submarine hull.
FIG. 4 is a diagrammatic view like that of FIG. 1, but of an afternate embodiment of the invention in which passive means (vice an energized "active" pump) provides pressurized water.

A passive embodiment of the present invention is shown in FIG. 4 wherein a cable tether 74 is payed out from a coil 84 through a flex hose 76. In this passive embodiment, a water scoop 78 is deployed in conjunction with the flex hose 76 when the torpedo is launched. The water scoop 78 is connected to directional nozzles 82 (schematically shown as a cross-section of a radially inwardly directed inner end portion of hose 80) via an intake hose 80 providing water delivery passages through which water can flow. Hydrodynamic pressure is generated as a function of water intake through the water scoop 78 as the submerged vessel travels through the marine environment. This passive embodiment eliminates the need for a water pump as utilized in the active embodiment of the invention, generating hydrodynamic pressure proportional to the speed of the submerged vessel.

Figure 5:
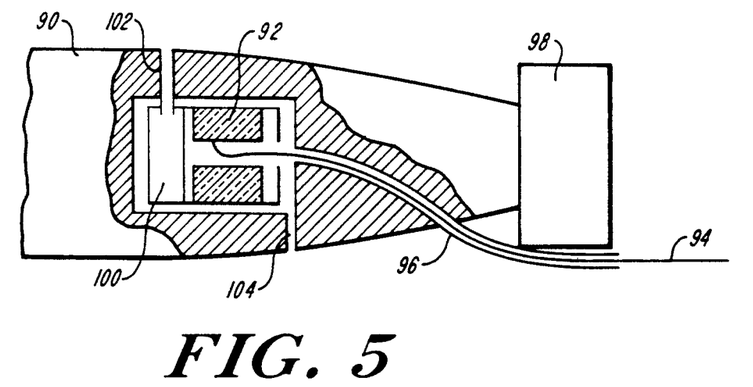
FIG. 5 is a diagrammatic view illustrating the cable deployment system of the present invention contained within a torpedo body.
Figure 6:
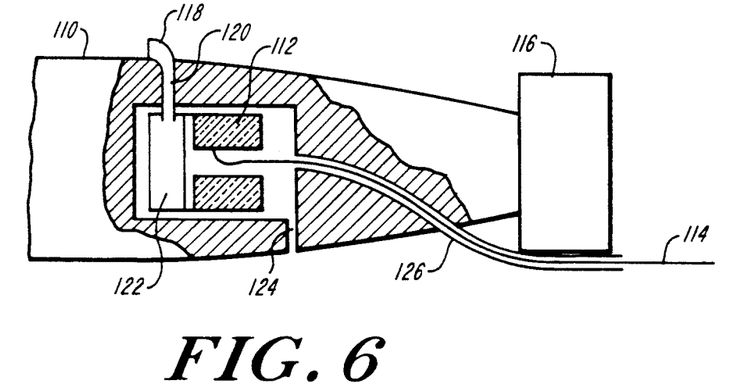
FIG. 6 is a diagrammatic view illustrating a passive embodiment of the cable deployment system of the present invention contained in a torpedo body.

The implementation of the present hydrodynamic cable deployment system in a torpedo is shown in FIGS. 5 and 6. A torpedo 90 houses a coil 92 of cable 94 which is payed out through a flex hose 96, allowing the cable 94 to be deployed into the marine environment at a position beyond the shroud 98 of the torpedo 90. FIG. 5 shows an active embodiment of the present invention wherein a water pump 100 draws water through an intake tube 102 to generate hydrodynamic pressure and provide a high pressure water that vortically acts and peels the cable off of the coil 92. FIG. 6 shows a passive embodiment of the present invention wherein a water scoop 118 is connected to directional nozzles 122 via intake hose 120 to induce the desired hydrodynamic pressure. Outlet ports 104, 124 may be provided to permit the release of some of the high-pressure water flow in the case where an excessively high water flow is generated by the pump 100 or the water scoop 118. It will be understood by those of skill in the art that it may also be necessary to provide some strengthening of the initial section of the cable tether so that the tether will survive the velocity transient caused by launching of the torpedo.

Figure 7:
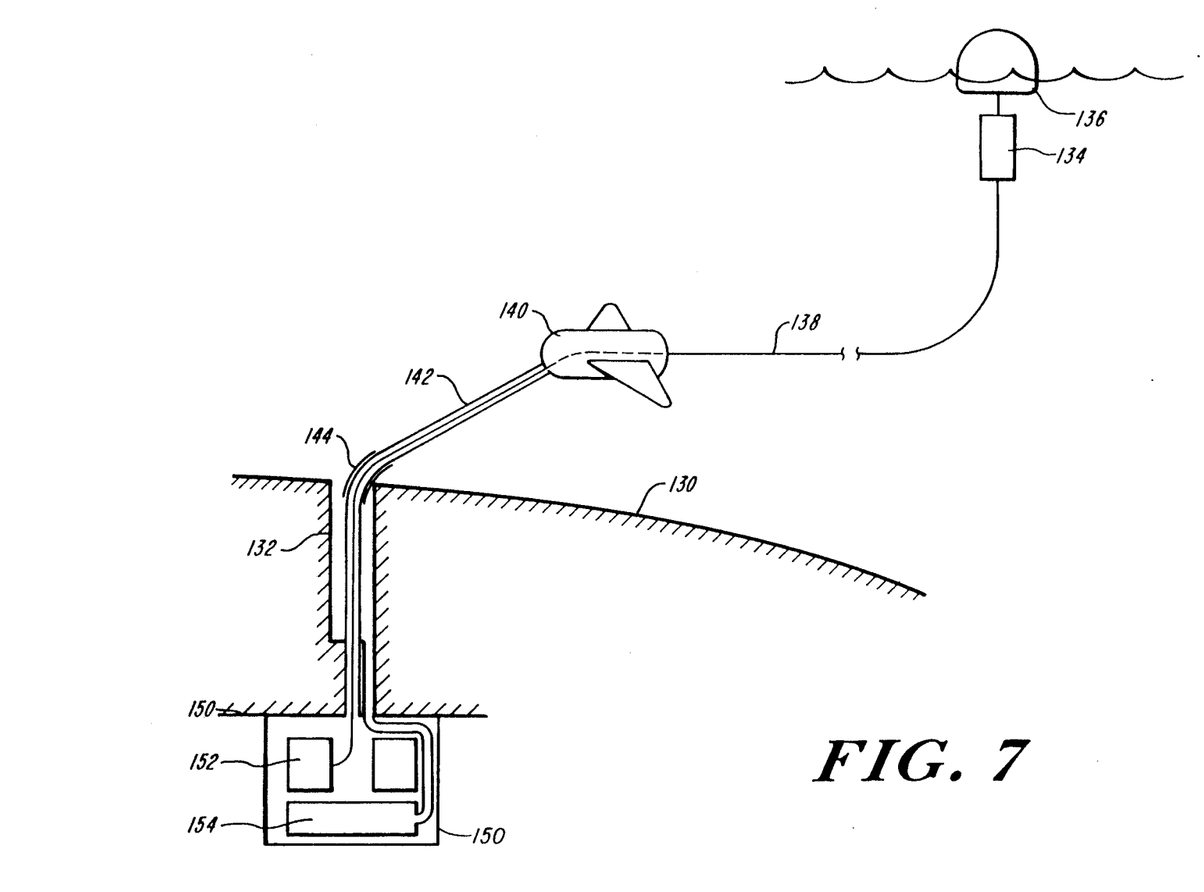
FIG. 7 is a diagrammatic view, like those of FIGS. 1 and 4, illustrating an embodiment of the invention related to launching a tethered communication buoy from a small diameter signal device ejection tube.
Figure 7A:
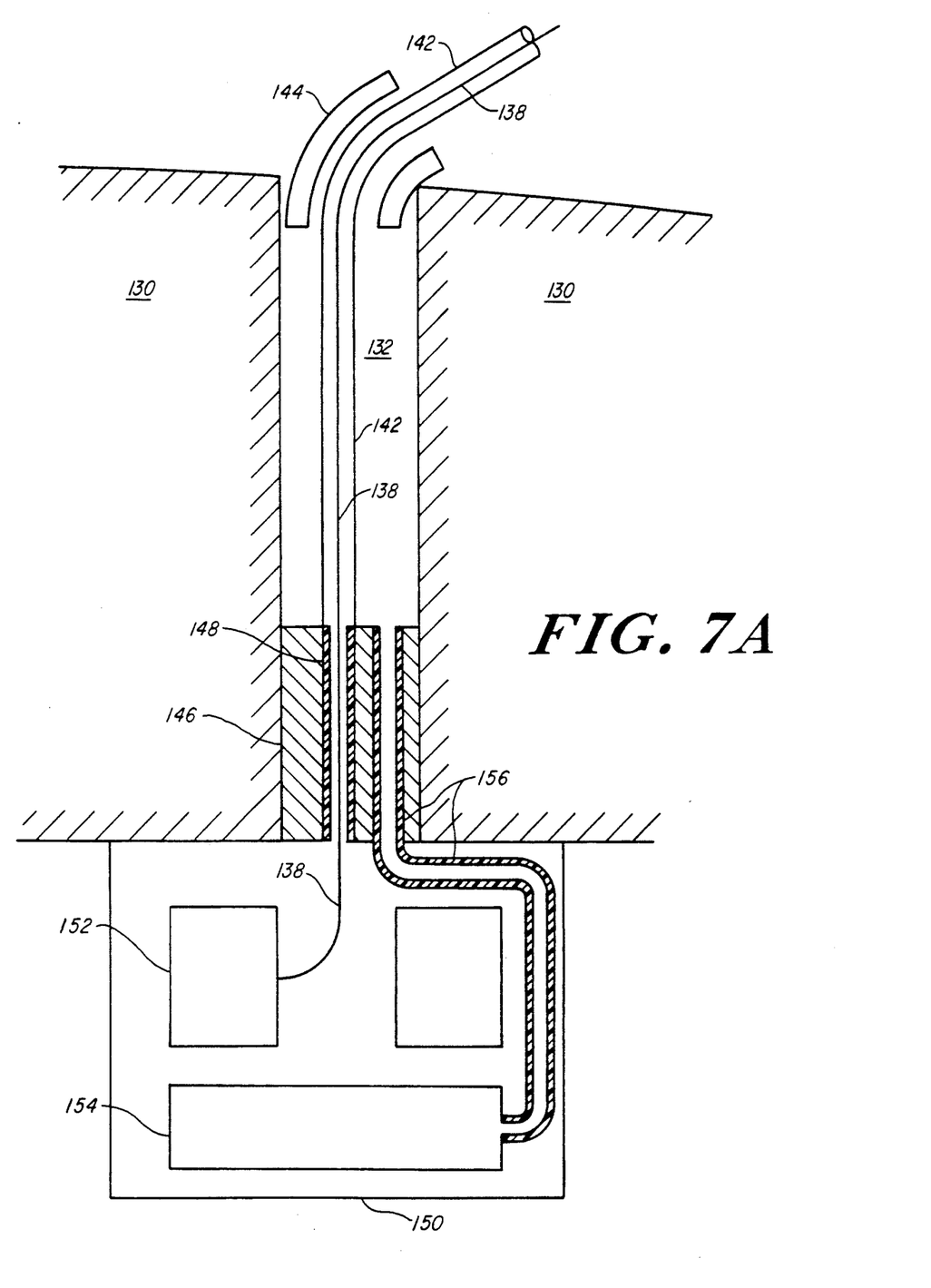
FIG. 7A is an enlargement of a portion of FIG. 7.

Referring now to FIGS. 7 and 7A, a cross section of a submarine's hull 130 is diagrammatically shown, along with a diagrammatic representation of a tethered communication buoy 134 (FIG. 7, only) floating at the ocean surface. The submarine hull 130 has a conventional embedded ejector chamber 132 of the 3 inch diameter type commonly provided in U.S. Naval submarines for the ejection of signal devices. However, in this instance the ejector tube is employed in connection with the launch of the communication buoy 134, which floats to the surface and deploys a communication antenna 136. Communication buoy 134 pays out from one end of an optical fiber communication link 138 from a small internal spool. In turn the submarine also pays out from the other end of optical fiber link 138 from a lifting body 140 (FIG. 7, only) that is towed by means of a pilot tube 142. Lifting body 140 creates lift to supplement the buoyancy of buoy 134. A bend limiter 144 is preferably provided where the pilot tube 142 exits ejector chamber 132 so that the pilot tube 142 does not collapse from the force caused by the drag of lifting body 140. A pressure-tight hose 148 (FIG. 7A, only) is provided where optical fiber link 138 passes through the launcher pressure boundary, namely breech door or barrel penetration 146 of ejector chamber 132. This maintains a sealed passage between the ejector chamber and the interior of a pressure-tight canister 150 which contains an optical fiber coil 152. Payout of the fiber from the coil is assisted by a water pump and nozzles 154 that draw water from the signal device ejector chamber through another pressure-tight hose 156 (FIG.

7A, only). The nozzles assist fiber payout in the manner which has been hereinbefore described in connection with FIG. 2. Water is forced by the pump through the pressure tight hose 148 and pilot tube 142 and this assists the payout of optical fiber from the submarine. It may also assist the fiber payout process to periodically reduce the diameter of the pressure-tight hose 148 and the pilot tube 142 as hereinbefore described in connection with flex nose 60, FIG. 3. For low speed applications, nozzles to assist peeling the fiber from the optical fiber coil may be unnecessary, with the primary benefit coming from the water flow which assists the fiber through the pressure tight hose 148 and pilot tube 142. The pressure tight hoses 148 and 156 may be eliminated by attaching the pressure tight canister 150 to the "wet" side of the signal ejector tube breech door or barrel penetration 146. The invention makes it possible to improve the performance of a tethered buoy which is launched from the standard 3 inch diameter signal device ejector tubes which are commonly employed in most of the U.S. Naval submarines presently in service. It is contemplated that advanced generations of submarines will have a 6 inch diameter signal ejector tube which may allow the fiber coil and pump to be located in the ejector tube chamber 132 or, alternatively, to have water pressure supplied by a passive scoop as hereinbefore described in connection with FIG. 4

Figure 8:
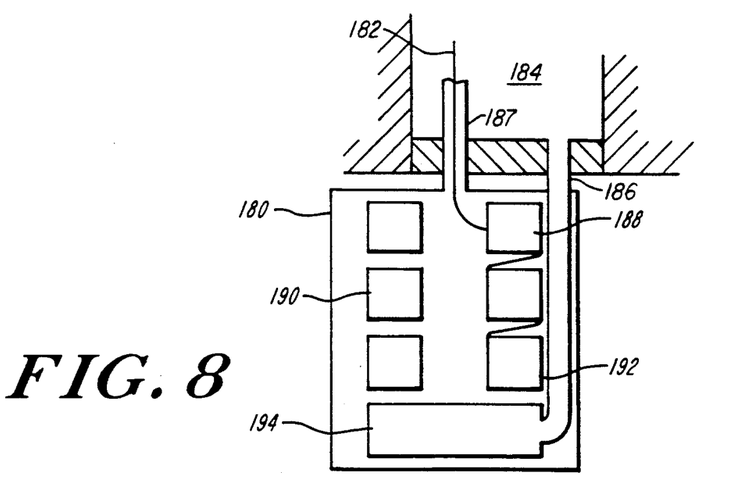
FIG. 8 is a diagrammatic view of a multi-coil embodiment of the present invention.

It is contemplated that the present invention can be used for deployment of cable from a multi-coil embodiment as shown in FIG. 8. In this embodiment, a pressure sealed canister 180, which houses multiple coils 188, 190, and 192 of optical fiber cable tether 182, is communicated with a signal device ejector chamber 184 via pressure-tight intake and outlet hoses, 186, and 187, respectively. The cable tether 182 is payed out from successive coils 188, 190 and 192 wherein each coil is spliced to one another so that a plurality of coils, each containing only a few kilometers of cable can be linked in series to provide a tether of much greater length. Water taken in from ejector tube 184 is flowed through pressure-tight hose 186 to a plenum chamber and pump mechanism 194 before the water is flowed up through the canister to pressure-tight outlet hose 187. Optionally, nozzles are provided in connection with plenum chamber and pump as has been hereinbefore described in connection with FIGS. 1, 2A and 2B to hydrodynamically assist in peeling the optical fiber tether cable from coils 188, 190 and 192, and impel it, and/or hydrodynamically drag it, or pull it, through pressure tight hose 187. Additional benefits can be realized through available technology which permits fusion splicing of fiber optic cable so that unused cable can be recovered and reused, reducing the operational costs associated with tethered buoys. For example, a concatenated group of ten kilometer spools can be used to support up to ten deployments of two kilometers each, or a single twenty kilometer cable deployment, yielding larger available communication time. Since the cost of cable is a major fraction of the costs of the expendable part of the buoy, recycling unused cable results in a major cost savings. Operational benefits can also be realized from the fact that a longer cable tether yields longer available communication time.

Figure 9:
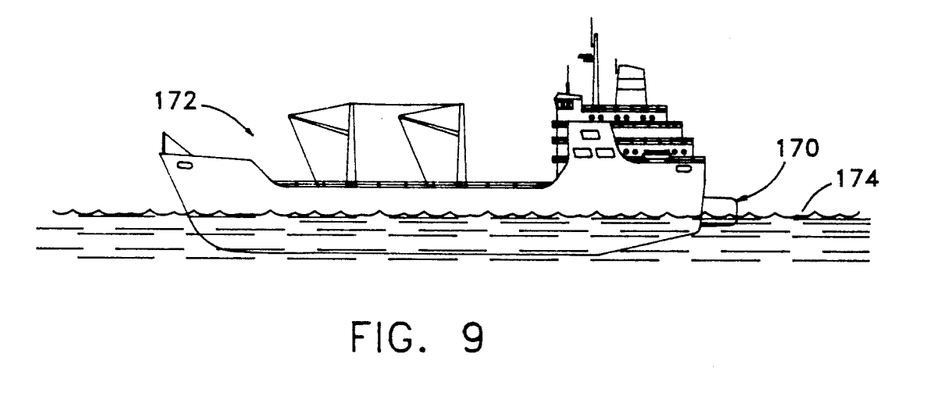
FIG. 9 is a pictorial view illustrating the hydrodynamic cable deployment system on board a surface ship.

Of course, as already mentioned, any of the embodiments of the instant invention schematically illustrated in FIG. 9 by box 170 may, with advantage, be mounted to surface vessel 172 born by a marine environment 174.

It will be appreciated that the present invention is not limited to the particular embodiments set forth herein and that various changes may be made to the invention such that all matter herein described or shown in the accompanying drawings is to be interpreted as illustrative only, embracing all modified forms thereof as may be within the scope of the following claims.

What is claimed is:

1. A hydrodynamically assisted cable deployment system suitable for use in deploying the tethered communications system from a marine vessel into a marine environment, comprising:

an annularly wrapped coil of cable from which cable is deployable in a direction of deployment along a reference axis and off an inside circumference of the coil which circumference is concentrically aligned with the reference axis; and means for generating hydrodynamic pressure for providing pressurized water flow in a vortical pattern in the direction of the cable deployment that acts against the inside circumference of the coil stripping said cable from the inner circumference of said annularly wrapped coil and moves it forcefully in the direction of cable deployment paying the same off of the annularly wrapped coil.

2. The hydrodynamically assisted cable deployment system of claim 1, wherein said means for generating hydrodynamic pressure includes means for pumping water in said direction of deployment to provide said pressurized water flow.

3. The hydrodynamically assisted cable deployment system of claim 1, wherein said means for generating hydrodynamic pressure includes intake means for receiving water from the marine environment as a function of speed of the marine vessel through said marine environment and directing the same as said pressurized water flow.

4. The hydrodynamically assisted cable deployment system of claim 3, wherein the hydrodynamic pressure generating means includes at least one directional nozzle for receiving the pressurized water flow and directing the same as a water flow stream to assist in deploying the cable from said annular coil.

5. The hydrodynamically assisted cable deployment system of claim 4, wherein said at least one directional nozzle that provides the water flow stream directs the same along the central reference axis of said annular coil of cable to produce a vortex traveling down the inside diameter thereof that strips said cable from said coil.

6. The hydrodynamically assisted cable deployment system of claim 4, wherein said at least one directional nozzle that provides the water flow stream directs the same along the inside diameter of said annular coil of cable to assist in peeling said cable away from the inside diameter thereof.

7. The hydrodynamically assisted cable deployment system of claim 1, further including a pilot hose through which said cable and said pressurized water flow travels for guiding said cable into the marine environment.

8. The hydrodynamically assisted cable deployment system of claim 7, further including a lifting body connected to said pilot hose for providing lift thereto in the marine environment.

9. The hydrodynamically assisted cable deployment system of claim 7, wherein said pilot hose further includes at least one diameter restriction located within the inside diameter thereof, said diameter constriction reducing the diameter of said pilot hose such that hydrodynamic pressure therethrough is increased.

10. The hydrodynamically assisted cable deployment system of claim 1, further comprising a pressure tight canister for housing said annular coil of cable from which said cable is deployed.

11. The hydrodynamically assisted cable deployment system of claim 10, comprising inlet passage means for allowing water from said marine environment to enter into said pressure tight canister for providing a source of water to said means for generating hydrodynamic pressure.

12. The hydrodynamically assisted cable deployment system of claim 1, comprising a plurality of said coils of cable connected in series.

13. The hydrodynamically assisted cable deployment system of claim 1, wherein said marine vessel is a submarine.

14. The hydrodynamically assisted cable deployment system of claim 1, wherein said marine vessel is a torpedo.

15. The hydrodynamically assisted cable deployment system of claim 1, wherein said marine vessel is a surface vessel.

16. The hydrodynamically assisted cable deployment system of claim 1, wherein said cable is fiber optic cable.

17. The hydrodynamically assisted cable deployment system of claim 2, wherein the hydrodynamic pressure generating means includes at least one directional nozzle for receiving the pressurized water flow and so directing the same as a stream of water flow to assist in deploying the cable from the coil.

* * * * *